United States Patent [19]

Riefe et al.

[11] Patent Number: 5,737,971
[45] Date of Patent: Apr. 14, 1998

[54] MOTOR VEHICLE STEERING COLUMN

[75] Inventors: Richard Kremer Riefe; James Richard Salois, both of Saginaw; Gerald Albert Gaeth, Frankenmuth, all of Mich.

[73] Assignee: General Motors Corporation, Detroit, Mich.

[21] Appl. No.: 695,811

[22] Filed: Aug. 5, 1996

[51] Int. Cl.⁶ ............................................ B62D 1/18
[52] U.S. Cl. ........................... 74/493; 280/775; 384/49
[58] Field of Search ........................... 74/493; 280/775; 384/49

[56] References Cited

U.S. PATENT DOCUMENTS

| | | | |
|---|---|---|---|
| 3,590,655 | 7/1971 | Farrell et al. | 74/492 |
| 3,788,148 | 1/1974 | Connell et al. | 74/492 |
| 3,801,166 | 4/1974 | York | 308/3.8 |
| 3,904,254 | 9/1975 | Hagen et al. | 308/3.8 |
| 3,966,273 | 6/1976 | Hagen et al. | 308/3.8 |
| 4,028,961 | 6/1977 | Utsumi et al. | 74/492 |
| 4,705,491 | 11/1987 | Andersson | 384/49 X |
| 4,774,851 | 10/1988 | Iwanami et al. | 74/493 |
| 5,222,814 | 6/1993 | Boelryk | 384/47 |
| 5,417,496 | 5/1995 | Hobbs | 384/18 |

FOREIGN PATENT DOCUMENTS 916599  1/1963  United Kingdom ............ 384/49

Primary Examiner—Allan D. Herrmann
Attorney, Agent, or Firm—Saul Schwartz

[57] ABSTRACT

A length adjustable motor vehicle steering column including a tubular first mast jacket element, a tubular second mast jacket element telescopically overlapping the first mast jacket element, a plurality of elastic rolling elements squeezed between linear tracks on the first and second mast jacket elements, a separator having a plurality of cells loosely receiving the elastic rolling elements and maintaining relative spacing therebetween, and a plurality of smaller inelastic rolling elements suspended by the separator between the linear tracks on the first and second mast jacket elements. The elastic rolling elements eliminate lash between the first and second mast jacket elements and support the first mast jacket element on the second mast jacket element for low friction relative linear translation. The inelastic rolling elements define positive stops which limit deformation of the elastic rolling elements and flexure of the steering column perpendicular to the longitudinal centerline thereof.

5 Claims, 3 Drawing Sheets

MOTOR VEHICLE STEERING COLUMN

FIELD OF THE INVENTION

This invention relates to length adjustable motor vehicle steering columns.

BACKGROUND OF THE INVENTION

A length adjustable motor vehicle steering column described in U.S. patent application Ser. No. 08/385,490, filed Feb. 8, 1995 and assigned to the assignee of this invention, includes a tubular first mast jacket element supported on a tubular second mast jacket element for telescopic linear translation by a pair of C-shaped plastic bearing rings. Lash between the first and second mast jacket elements is eliminated by a spring which thrusts the bearing rings in opposite longitudinal directions to wedged positions between a cylindrical wall of the tubular first mast jacket element and a pair of longitudinally separated frustoconical shoulders on the tubular second mast jacket element. A length adjustable motor vehicle steering column according to this invention is an alternative to the motor vehicle steering column described in the aforesaid U.S. Ser. No. 08/385,490.

SUMMARY OF THE INVENTION

This invention is a new and improved length adjustable motor vehicle steering column including a tubular first mast jacket element, a tubular second mast jacket element telescopically overlapping the first mast jacket element, a plurality of elastic rolling elements squeezed between linear tracks on the first and second mast jacket elements, a separator having a plurality of cells loosely receiving the elastic rolling elements and maintaining relative spacing therebetween, and a plurality of smaller inelastic rolling elements suspended by the separator between the linear tracks on the first and second mast jacket elements. The elastic rolling elements eliminate lash between the first and second mast jacket elements and support the first mast jacket element on the second mast jacket element for low friction relative linear translation in the direction of a longitudinal centerline of the steering column. The inelastic rolling elements define positive stops between the first and second mast jacket elements which limit deformation of the elastic rolling elements and flexure of the steering column perpendicular to the longitudinal centerline thereof. In a preferred embodiment, the elastic rolling elements are elastomeric spheres and the inelastic rolling elements are steel spheres.

DESCRIPTION OF A PREFERRED EMBODIMENT

Figure 1:
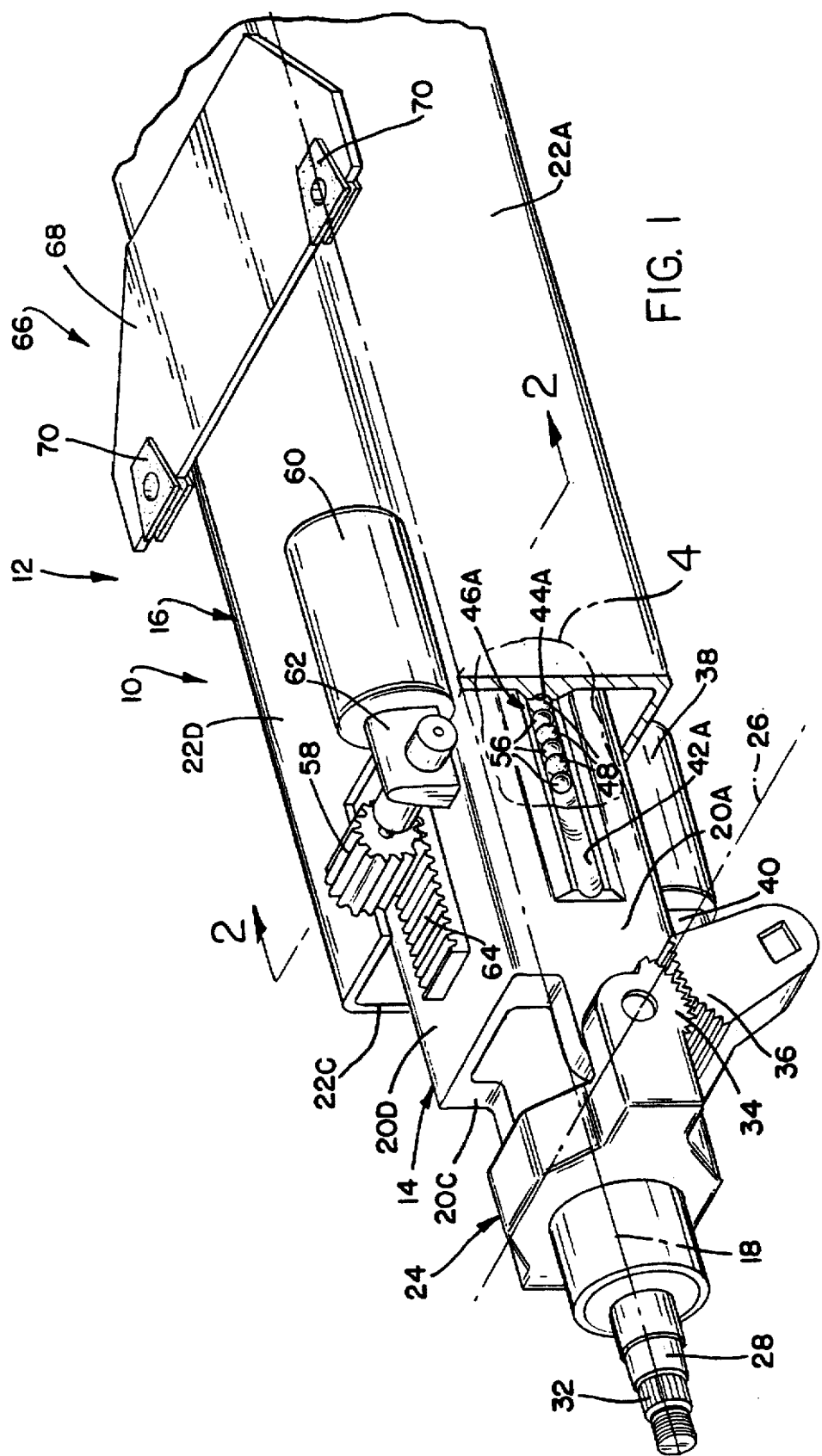
FIG. 1 is a fragmentary, partially broken-away, perspective view of a length adjustable motor vehicle steering column according to this invention.
Figure 2:
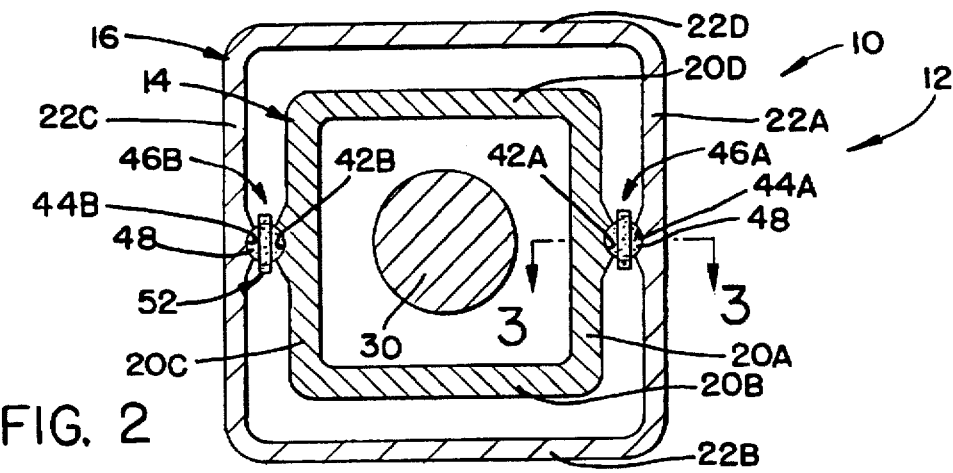
FIG. 2 is a sectional view taken generally along the plane indicated by lines 2—2 in FIG. 1.
Figure 3:
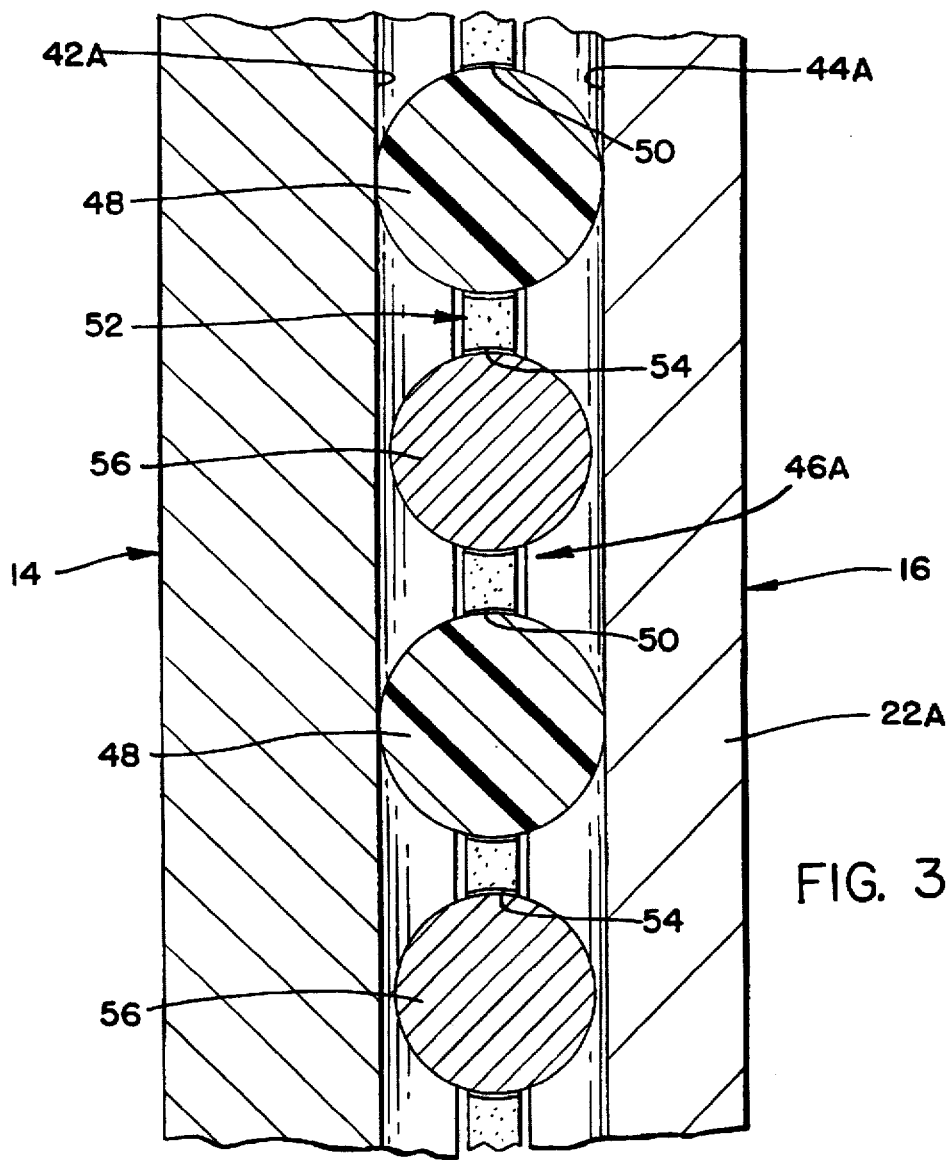
FIG. 3 is an enlarged sectional view taken generally along the plane indicated by lines 3—3 in FIG. 2.

Referring to FIGS. 1–3, a mast jacket 10 of a length adjustable motor vehicle steering column 12 according to this invention includes a tubular first element 14 and a tubular second element 16 telescopically overlapping the first element in the direction of a longitudinal centerline 18 of the steering column. The tubular first element 14 has a plurality of flat sides 20A, 20B, 20C, 20D parallel to the longitudinal centerline 18. The tubular second element 16 has a plurality of flat sides 22A, 22B, 22C, 22D parallel to the longitudinal centerline 18 facing the flat sides 20A, 20B, 20C, 20D, respectively, on the first element where the two telescopically overlap.

A tilt housing 24 is supported on the tubular first element 14 for up and down pivotal movement about a lateral centerline 26 of the steering column. An upper steering shaft 28 is rotatably supported on the tilt housing 24 and connected to a lower steering shaft 30, FIG. 2, by a universal joint, not shown, the center of which coincides with the intersection of the longitudinal and lateral centerlines 18, 26 of the steering column. A steering wheel, not shown, is rigidly connected to the upper steering shaft 28 at a splined end 32 of the latter, FIG. 1. A rigid gear sector 34 on the tilt housing 24 meshes with a gear sector 36 rotatably supported on the tubular first element 14 of the mast jacket 10.

A first electric motor 38 on the tubular first element 14 of the mast jacket 10 pivots the gear sector 36 through a first speed reducer 40 to effect up and down pivotal movement of the tilt housing 24 about the lateral centerline 26. The gear ratio of the first speed reducer 40 is selected to prevent the gear sector 34 from backdriving the gear sector 36 so that when the first electric motor is off, the gear sectors 34, 36 and the first speed reducer 40 cooperate to capture the vertical position of the tilt housing 24 relative to the tubular first element 14.

A pair of concave linear tracks 42A, 42B on the flat sides 20A, 20B, respectively, of the tubular first element 14 face a pair of concave linear tracks 44A, 44B on the flat sides 22A, 22B, respectively, of the tubular second element 16 and cooperate therewith in defining a pair of linear channels 46A, 46B between the first and second elements parallel to the longitudinal centerline 18 of the steering column. The longitudinal channels 46A, 46B are disposed in a common plane with the longitudinal centerline 18 which plane, therefore, constitutes a longitudinal centerplane of the steering column.

The tubular first mast jacket element 14 is mounted on the tubular second mast jacket element 16 for relative linear translation in the direction of the longitudinal centerline 18 by a plurality of spherical elastic rolling elements 48 in the linear channels 46A, 46B. The elastic rolling elements are made of actal, having a modulus of elasticity of about 3100 MPa, and have a diameter which exceeds the lateral span of the linear channels 46A, 46B, i.e., the span perpendicular to the longitudinal centerline 18, so that the elastic rolling elements 48 are squeezed or resiliently compressed between the facing pairs of linear tracks 42A, 44A and 42B, 44B.

Figure 4:
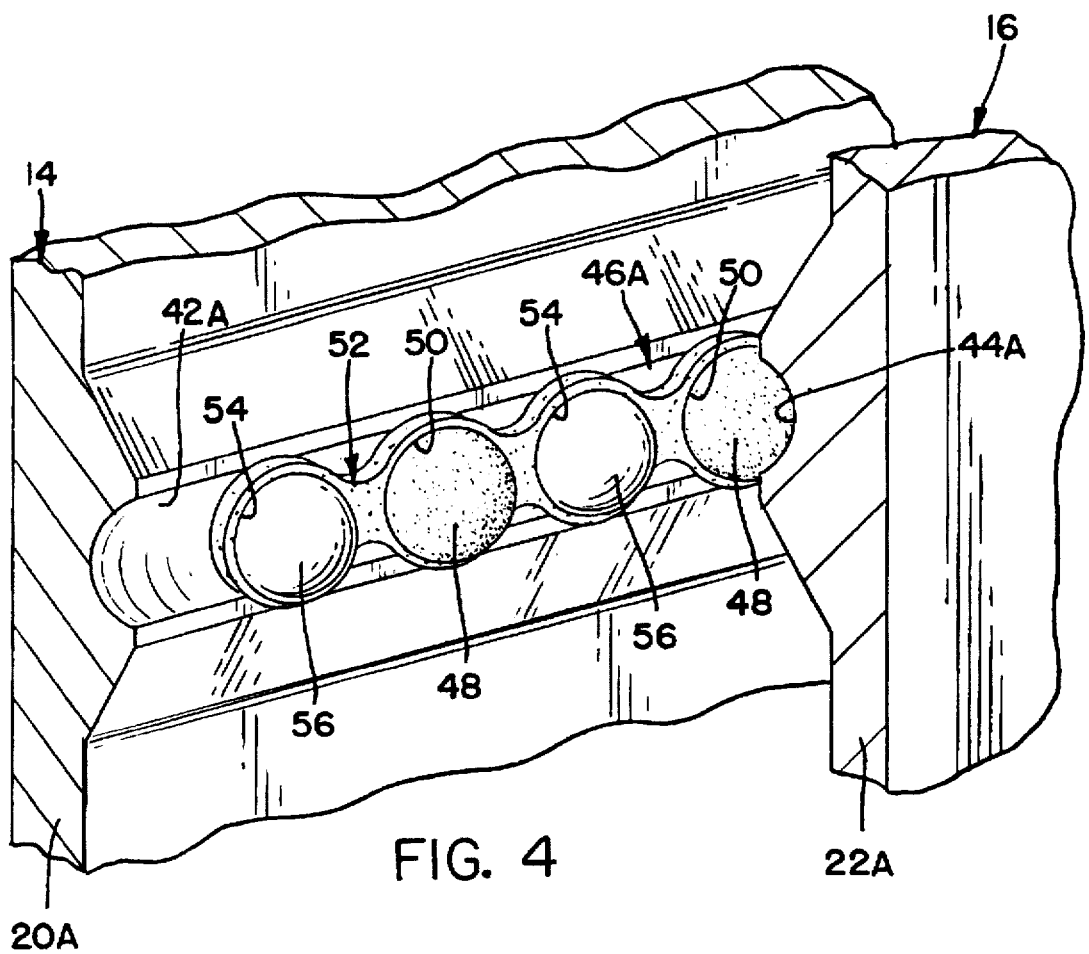
FIG. 4 is an enlarged view of the portion of the length adjustable motor vehicle steering column according to this invention within reference zone 4 in FIG. 1.

As seen best in FIGS. 3–4, the elastic rolling elements 48 are loosely received in respective ones of a plurality of large cells 50 of a pair of plastic separators 52. The separators 52 maintain constant longitudinal spaces between the elastic rolling elements during relative linear translation between the tubular first and second elements 14, 16 of the mast jacket and spread the elastic rolling elements out in the direction of the longitudinal centerline 18 of the steering column.

The difference between the diameter of the elastic rolling elements 48 and the lateral span of the linear channels 46A, 46B is calculated to effect enough resilient deformation of the elastic rolling elements to eliminate lash between the tubular first and second elements 14, 16 without unnecessarily increasing the drag of the elastic rolling elements between the tubular first and second elements 14, 16. The longitudinal spread of the elastic rolling elements is calculated to maximize the rigidity of the steering column 12 perpendicular to the longitudinal centerline 18.

The plastic separator 52 has a plurality of small cells 54 interposed between adjacent pair of large cells 50. A plurality of spherical inelastic rolling elements 56 is relatively tightly captured in respective ones of the small cells 54. The inelastic rolling elements are made of steel, having a modulus of elasticity which substantially exceeds that of the elastic rolling elements 48, and have a diameter which is less than the diameter of the elastic rolling elements 48 so that the inelastic rolling elements 56 are suspended by the plastic separators 52 in the linear channels 46A, 46B substantially out of contact with the tubular first and second elements 14, 16 of the mast jacket. The inelastic rolling elements 56, therefore, do not impede relative linear translation between the tubular first and second mast jacket elements.

A pinion gear 58 is rotatably supported on the tubular second element 16 of the mast jacket and is driven in opposite directions by a second electric motor 60 on the tubular second element through a second speed reducer 62. The pinion gear 58 meshes with a rack gear 64 rigidly attached to the side 20D of the tubular first element 14 of the mast jacket 10. When the second electric motor is on, the pinion 58 and rack 64 cooperate to effect relative linear translation between the tubular first and second elements 14, 16 of the mast jacket in the direction of the longitudinal centerline 18 of the steering column to vary the length of the steering column. The gear ratio of the second speed reducer 62 is selected to prevent the rack 64 from backdriving the pinion 58 so that when the second electric motor is off, the pinion 58, the rack 64, and the second speed reducer 62 cooperate to capture the linear position of the tubular first element 14 relative to the tubular second element 16.

The steering column 12 is rigidly connected to a body structure, not shown, of a motor vehicle through a schematically represented releasable attachment 66 and through an energy absorber, not shown, both of which may be as described in U.S. Pat. No. 3,392,599, issued Jul. 16, 1968 and assigned to the assignee of this invention. To achieve a comfortable vertical position of the steering wheel, the operator turns on the first electric motor 38 to pivot the tilt housing 24 up or down about the lateral centerline 26. To achieve a comfortable longitudinal position of the steering wheel, the operator turns on the second electric motor 60 to change the length of the steering column by effecting relative linear translation between the tubular first and second elements 14, 16. During such relative linear translation, the elastic rolling elements 48 yield resiliently and roll easily in the linear channels 46A, 46B.

The schematically represented releasable attachment 66 includes a rigid bracket 68 on the tubular second element, a pair of capsules 70 in a corresponding pair of slots in the rigid bracket, and a pair of hanger bolts, not shown, on the body extending through the capsules 70. The capsules are retained on the bracket 68 by plastic shear pins, not shown, and are clamped to the body by nuts on the hanger bolts below the capsules.

An impact of substantial magnitude on the aforesaid steering wheel on the upper steering shaft 28 usually has a linear component parallel to the longitudinal centerline 18 of the steering column and a lateral or overturning component perpendicular to the longitudinal centerline 18. The linear component initiates fracture of the aforesaid plastic shear pins and release of the rigid bracket 68 from the hanger bolts and, concurrently, a linear collapse stroke of the tubular first and second mast jacket elements 14, 16 as a rigid unit. In the course of the unitary linear collapse stroke of the tubular first and second elements, the aforesaid energy absorber converts into work a fraction of the kinetic energy of the impact on the steering wheel.

The lateral component of the impact on the steering wheel induces an overturning force couple, i.e., a bending moment, on the steering column perpendicular to the longitudinal centerline 18. The magnitude of such overturning force couple substantially exceeds corresponding force couples induced by normal operation of the steering column 14 so that the elastic rolling elements yield further in compression between the facing pairs of linear tracks 42A, 44A and 42B, 44B. The inelastic rolling elements 56, however, define hard stops between the first and second elements 14, 16 of the mast jacket which interfere with the facing pairs of linear tracks 42A, 44A and 42B, 44B to positively limit flexure of the steering column perpendicular to the longitudinal centerline 18.

Figure 5:
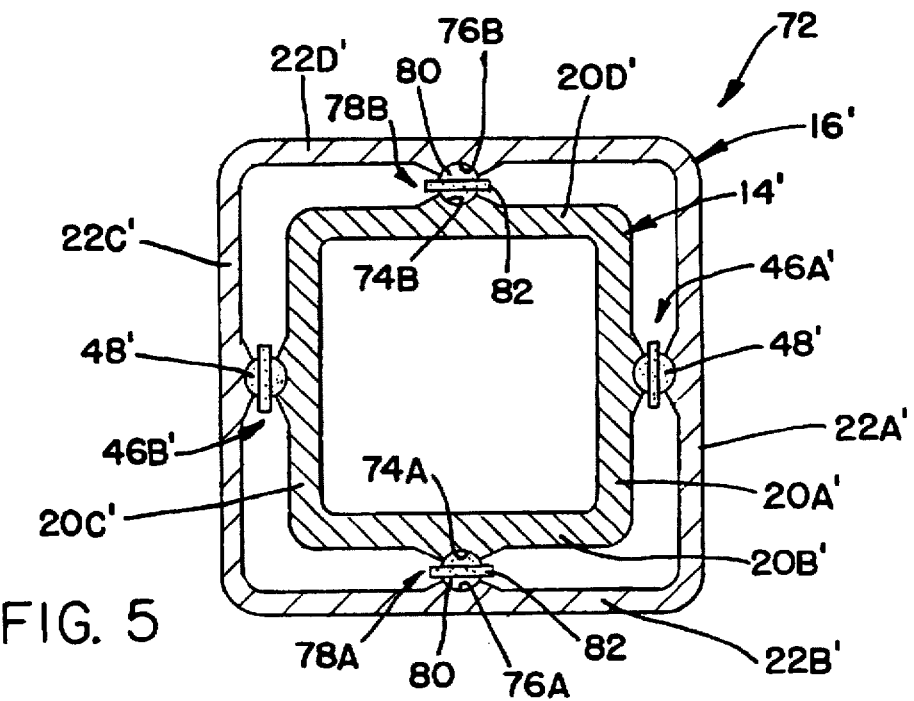
FIG. 5 is similar to FIG. 2 but showing a modified embodiment of the length adjustable motor vehicle steering column according to this invention.

A modified length adjustable motor vehicle steering column 72 according to this invention is fragmentarily illustrated in FIG. 5 and is identical to the steering column 12 except as now described. Structural elements common to the steering column 12 and to the modified steering column 72 are identified by primed reference characters. The modified steering column 72 includes a second pair of concave linear tracks 74A, 74B on the flat sides 20B', 20D' of the tubular first element 14' facing a second pair of concave linear tracks 76A', 76B' on the flat sides 22B', 22D' of the tubular second element 16' and cooperating therewith in defining a second pair of linear channels 78A, 78B between the first and second tubular elements parallel to the longitudinal centerline of the steering column. The linear channels 78A, 78B are disposed in a second longitudinal centerplane of the steering column perpendicular to the aforesaid first longitudinal centerplane.

A plurality of spherical elastic rolling elements 80 identical to the elastic rolling elements 48 are squeezed in the second pair of linear channels 78A, 78B and loosely received in respective ones of a plurality of large cells of a second pair of plastic separators 82. The second pair of separators 82 maintain constant longitudinal spaces between the elastic rolling elements 80 in the second pair of linear channels 78A, 78B and spread the elastic rolling elements parallel to the longitudinal centerline 18. The spherical elastic rolling elements 80 in the second pair of linear channels 78A, 78B operate like the spherical elastic rolling elements 48' in the first pair of linear channels 46A', 46B' to support the tubular first element 14' on the tubular second element 16' for relatively frictionless, lash-free linear translation.

A plurality of inelastic rolling elements, not shown, is suspended by the second pair of plastic separators 82 in the second pair of linear channels 78A, 78B substantially out of contact with the tubular first and second elements 14', 16' of the mast jacket. The spherical inelastic rolling elements in the second pair of linear channels 76A, 76B operate like the spherical inelastic rolling elements 56' in the first pair of linear channels 46A', 46B' to limit flexure of the steering column 14' perpendicular to the longitudinal centerline 18'.

What is claimed is:

1. A length adjustable motor vehicle steering column comprising:

a tubular first mast jacket element, a tubular second mast jacket element telescopically overlapping said first mast jacket element, a track means on said first mast jacket element, a track means on said second mast jacket element cooperating with said track means on said first mast jacket element in defining a plurality of linear channels parallel to a longitudinal centerline of said steering column, a plurality of elastic rolling elements resiliently squeezed in each of said plurality of linear channels to support said first mast jacket element on said second mast jacket element for lash free relative linear translation parallel to said longitudinal centerline of said steering column and spread out parallel to said longitudinal centerline of said steering column to minimize flexure of said steering column perpendicular to said longitudinal centerline thereof, a plurality of inelastic rolling elements smaller than said elastic rolling elements, and means operative to suspend said inelastic rolling elements in each of said plurality of linear channels substantially out of contact with said track means on each of said first and said second mast jacket elements so that said inelastic rolling elements define hard stops which positively limit flexure of said steering column perpendicular to said longitudinal centerline thereof without interfering with relative linear translation between said first and said second mast jacket elements.

2. The length adjustable motor vehicle steering column recited in claim 1 wherein:

each of said elastic rolling elements is a sphere, and each of said inelastic rolling elements is a sphere having a diameter less than the diameter of each of said elastic rolling elements.

3. The length adjustable motor vehicle steering column recited in claim 2 wherein:

each of said elastic rolling elements is made of an elastomer having a modulus of elasticity of about 3100 MPa, and each of said inelastic rolling elements is made of metal.

4. The length adjustable motor vehicle steering column recited in claim 3 wherein:

each of said inelastic rolling elements is disposed between a pair of said elastic rolling elements.

5. The length adjustable motor vehicle steering column recited in claim 4 wherein said means operative to suspend said inelastic rolling elements in each of said plurality of linear channels substantially out of contact with said track means on each of said first and said second mast jacket elements comprises:

a separator having a plurality of large cells loosely receiving respective ones of said elastic rolling elements and a plurality of small cells relatively tightly receiving respective ones of said inelastic rolling elements.

\* \* \* \* \*